(12) United States Patent
Hiura

(10) Patent No.: US 6,364,079 B1
(45) Date of Patent: Apr. 2, 2002

(54) CABLE REEL

(75) Inventor: Yasuhiro Hiura, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 09/607,961

(22) Filed: Jun. 30, 2000

(30) Foreign Application Priority Data

Jul. 7, 1999 (JP) ............................................. 11-192980

(51) Int. Cl.$^7$ ................................................ H02G 11/02
(52) U.S. Cl. ..................................................... 191/12.4
(58) Field of Search ........................... 191/12.2 R, 12.4, 191/12 R

(56) References Cited

U.S. PATENT DOCUMENTS 5,651,686 A * 7/1997 Okuhara et al. ............ 439/164
5,773,776 A    6/1998 Uleski et al.

FOREIGN PATENT DOCUMENTS

| DE | 4329117 | 3/1995 |
|---|---|---|
| DE | 19533439 | 2/1997 |
| EP | 0486867 | 5/1992 |
| EP | 0630082 | 12/1994 |
| EP | 0797273 | 9/1997 |

* cited by examiner

*Primary Examiner*—S. Joseph Morano
*Assistant Examiner*—Robert J. McCarry, Jr.
(74) *Attorney, Agent, or Firm*—Greenblum & Bernstein, P.L.C.

(57) ABSTRACT

There is provided a means for improving the form of a cable reel in which a combination switch fixing area is made integral in form. An opening is provided in a portion of a peripheral wall on a fixed case of the cable reel. A connector housing is unitarily provided with a combination switch fixing area is provided on a bottom wall at the bottom of the opening. A welding area between a flat cable of a connector is connected with the exposed conductor of a flat cable, and a bus-bar is positioned on the opening. A welding area between the bus-bar and the cable is interfitted and mounted in the connector housing, and then the opening of peripheral wall of the fixing case is covered with a cover, which is then made continuous with the peripheral wall with the cover having the same curvature as that of the peripheral wall.

10 Claims, 3 Drawing Sheets

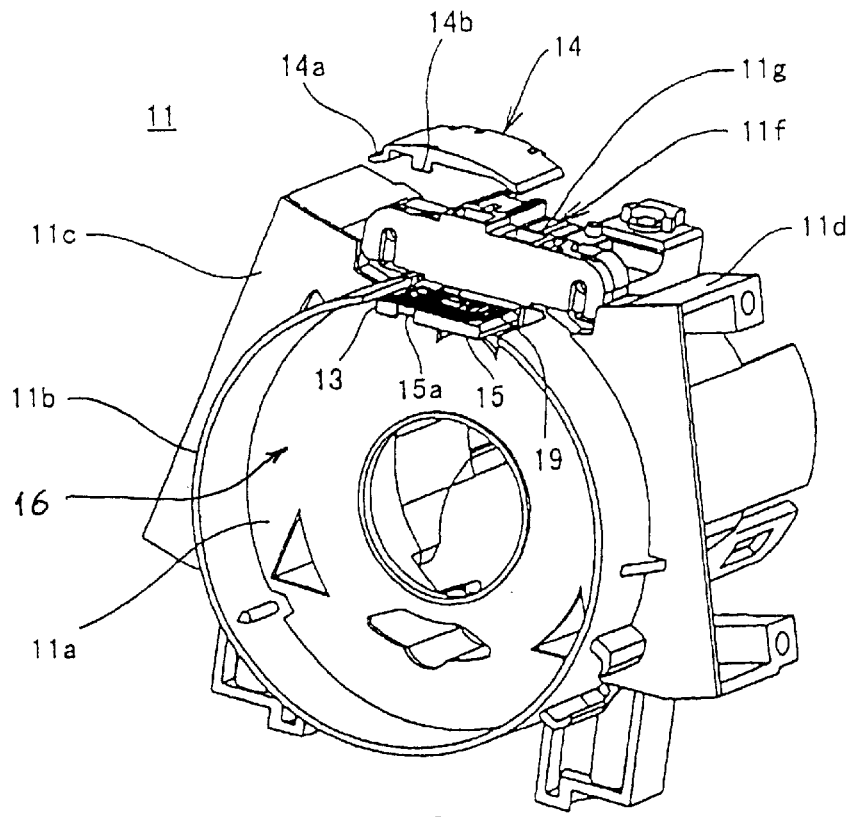
FIG.2
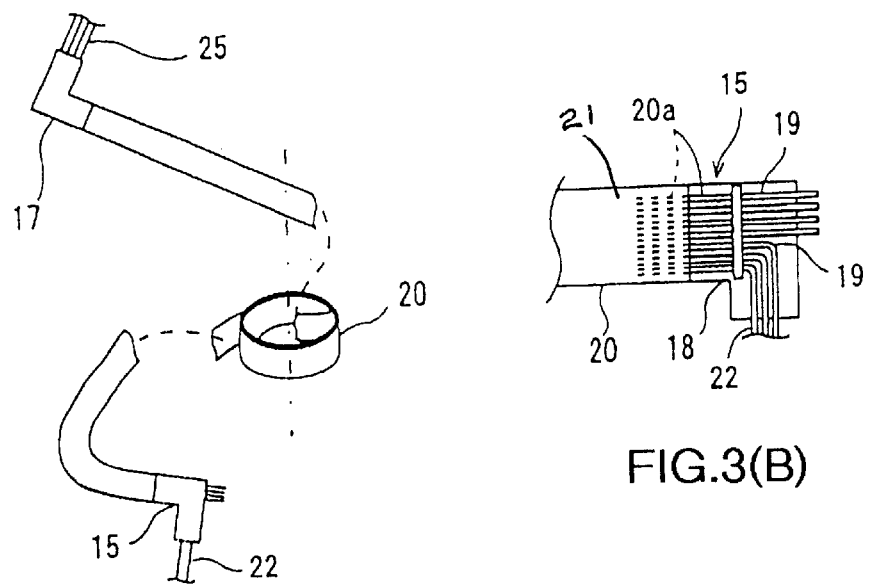
FIG.3(A)
FIG.3(B)

CABLE REEL

BACKGROUND OF THE INVENTION

1. Field of the Invention

The present invention relates to a cable reel to be mounted on a steering device of automobile and, more particularly, to configure a large fixing case to be smaller in size and more attractive when providing a combination switch fixing area integrally with the fixing case of the cable reel.

2. Description of Background Information

On a steering device of automobile, a fixed case is provided which includes a protruding peripheral wall having an annular bottom wall. A rotor is rotatably within the inner periphery of the peripheral wall, and the rotor is provided with an annular upper wall. An annular cable housing is formed by intermitting the rotor in a rotatable manner with the fixed case, and a cable reel is mounted to house a flat cable in the annular cable housing in a spiral manner. A connector fixed on the internal end of the flat cable rotates with the flat cable in accordance with the rotation of the steering device which is fixed with the rotor, while a connector fixed on the external end of the flat cable is fixed on a fixed case which is fixed to the body of the automobile.

Conventionally, on a steering device, a combination switch mounting member is mounted separately from the cable reel, which is connected with a connector mounted on a fixed case of cable reel. However, in order to achieve a cost savings by reducing the number of components, a combination switch fixing area may be integrally mounted on the fixed case of the cable reel.

That is, as shown in FIG. 4 of the drawings, a connector housing 1b provides a combination switch mounting area on a peripheral wall 1a of a fixed case 1 having a bottom opening 1c. A flat cable 4 is inserted into the fixed case 1, and both terminals of the flat cable 4 are connected with connectors 2 and 3. The connector 2 is connected with the external end of flat cable 4 through the bottom opening 1c and then is inserted into a connector housing 1b. A case 5 having an annular bottom wall is interfitted and fixed within the bottom opening 1c of fixed case 1, and a movable rotor 6 is mounted in a rotatable manner in an upper opening of the fixed case 1. A rotor cover 7 is fixed to the rotor 6 after interfitting and fixing the connector 3, and a locking collar 8 is inserted in a rotatable manner into the bottom wall of case 5 and connected to the rotor 6.

With the structure described above, the number of components becomes greater, which causes such problems as increasing the number of assembling processes due to providing a bottom wall of case 5 and disposing the bottom wall of the fixed case 1 as a separate body. However, when the bottom wall of case 5 is made continuous to a peripheral wall by forming the same unitarily with the fixed case 1, it is necessary to provide a notch in the peripheral wall. When such a notch is provided, the connecting area between the flat cable and the connector become exposed on the peripheral wall side, causing possible intrusion of foreign matter thereinto, which gives rise to poor appearance and problems of impairing the performance of the cable reel.

In addition, as shown in FIG. 4, providing a connector housing 1b which is integral with a combination switch fixing area protruding from the peripheral wall 1a of fixing case 1 requires a larger external form for the fixing case 1, thereby causing the problem of requiring a larger installation space.

The present invention was made in view of the aforementioned problems, with the objectives of reducing the number of components and the assembling processes by forming the bottom wall of the fixed case unitarily and in one piece with the fixed case, and with an aim to avoid increasing the size of the fixed case.

SUMMARY OF THE INVENTION

The present invention provides a cable reel which includes a fixed case having a peripheral wall that protrudes from an outer periphery of an annular bottom wall, a moveable case having a peripheral wall that protrudes from the inner periphery of an annular upper wall, the fixed case and the movable case being interfitted in a rotatable manner and forming an annular cable housing space. The fixed case and the movable case house a flat a flat cable spirally in the cable housing. An opening is formed in a portion of the peripheral wall of the fixed case, and the connector housing is provided with a combination switch fixing area formed unitarily and in one piece on the bottom wall at a lower end of the opening area.

Additionally, a connector is connected with the terminal of external cable by welding at a vertical lower end of a bus-bar by laying narrow-strip bus-bars in parallel on an insulation board with the exposed ends of the flat cable conductors welded to the ends in the horizontal direction of each bus-bar. Accordingly, the welding area of the flat cable and the bus-bar of the connector is positioned at the opening, the welding area of the bus-bar and the cable is interfitted into the connector housing, and the opening in the peripheral wall of the fixed case is covered with a cover such that a continuous peripheral wall is provided having the same curvature as the cover. The cover is fixed to the peripheral wall by one of a lock connection and thermal adhesive.

With the cable reel of the present invention, a spirally-housed flat cable having both ends connected with connectors is inserted from an upper opening of a fixed case, a connector connected with an external peripheral end of flat cable is inserted downwardly in an opening provided on the peripheral wall of the fixed case and is interfitted with a connector housing protruding downwardly from the bottom wall. In such a manner, after a flat cable is housed in the fixed case, an opening in the peripheral wall of the fixed case is closed by a cover, thus covering a welded area between the flat cable and a bus-bar.

As mentioned above, because the bottom wall is formed unitarily and in one piece with the fixed case, a reduction in the number of components and assembling processes can be achieved compared with the situation where the bottom wall is provided as separate member.

In addition, since the opening of the peripheral wall is closed with a cover, and the cover does not protrude from the peripheral wall and is made to have a configuration that forms a part of the peripheral wall housing having the same curvature as that of the peripheral wall, the outer diameter of the cable reel does not increase. Furthermore, since the connector housing is formed unitarily and in one piece with the combination switch fixing area that protrudes downwardly from the bottom wall, it is possible to unitarily connect the combination switch fixing area without increasing the outer diameter of the cable reel.

In another aspect of the invention, a cable reel is provided that includes a fixed case having an annular bottom wall. The fixed case includes a peripheral wall that extends upwardly from an outer periphery of the annular bottom wall. A movable case is provided having an annular upper wall, and the movable case includes a peripheral wall that extends outwardly from the inner periphery of the annular upper wall. The fixed case and the movable case are configured to interfit in a rotatable manner and to form an annular cable housing space. A flat cable is spirally wound in the annular cable housing space, an opening is formed in a portion of the peripheral wall of the fixed case, and a connector housing is formed unitarily and in one piece with a combination switch fixing area on the bottom wall at a lower end of the opening area.

In a further aspect of the present invention, the cable reel includes a connector connected to the terminals of an external portion of the cable at a vertical lower end of a bus-bar. The connector may be connected to the terminals of the external portion of the portion of the cable by welding, and the welding may further include laying narrow-strip bus-bars in parallel on an insulation board with exposed ends of flat cable conductors welded to ends of each bus-bar in a horizontal direction. Additionally, the welding area of the flat cable and the bus-bar of the connector may be positioned at the opening, and the welding area of the bus-bar and the cable may be interfitted into the connector housing.

In other aspects of the present invention, the opening in the peripheral wall of the fixed case may be provided with a cover, such that a continuous peripheral wall is provided, and the cover may be provided to have a same curvature as the peripheral wall of the fixed case. Additionally, the cover may be fixed to the peripheral wall by one of a locking connection and thermal adhesive.

BRIEF DESCRIPTION OF THE DRAWINGS

The above and the other objects, features and advantages of the present invention will be made apparent from the following description of the preferred embodiments, given as non-limiting examples, with reference to the accompanying drawings, in which:

FIG. 2 is a perspective view of a fixed case of the cable reel of FIG. 1.

FIG. 3(A) is an exploded perspective view of the flat cable; and FIG. 3(B) is an enlarged view of a major portion of the flat cable.

DESCRIPTION OF THE PREFERRED EMBODIMENTS

Figure 1:
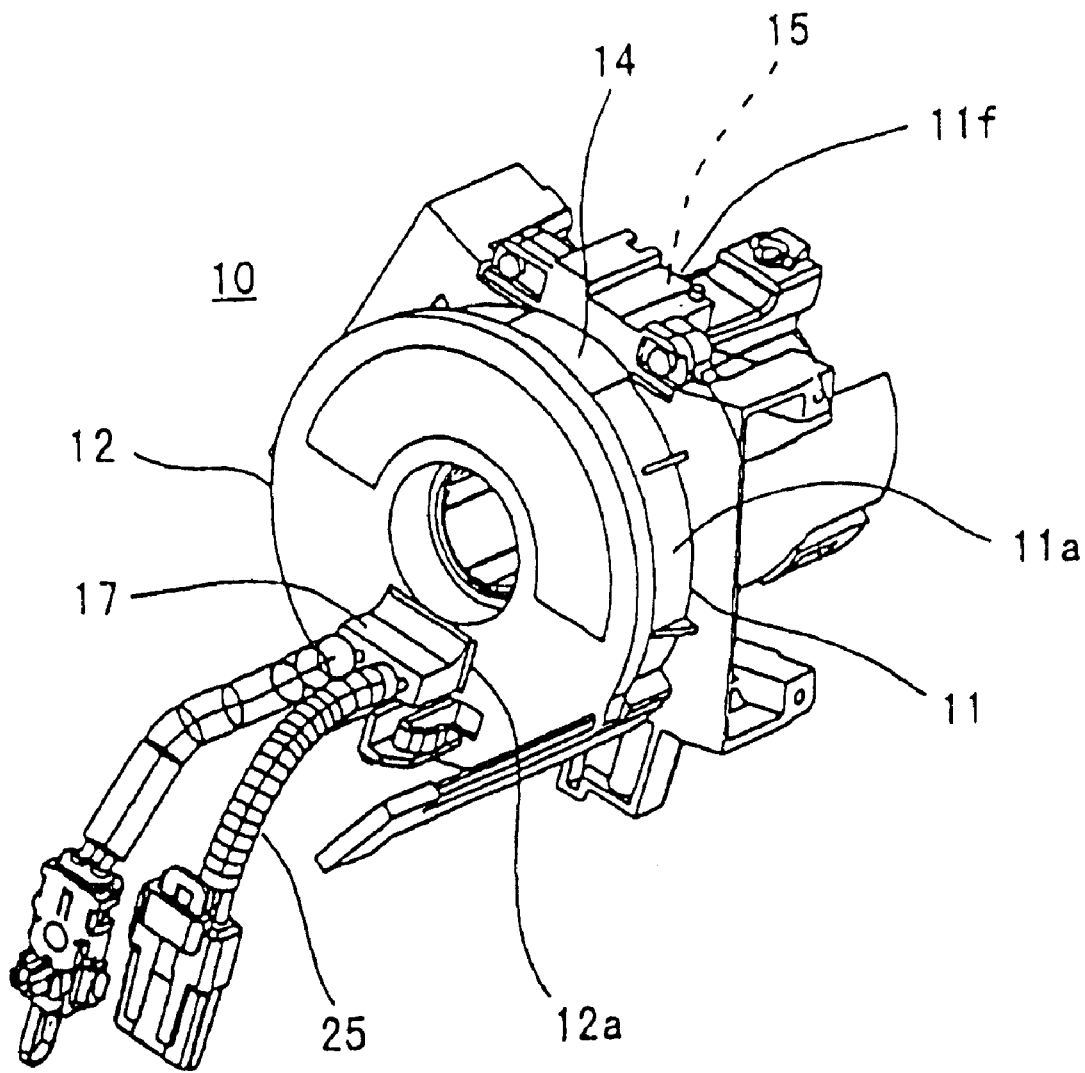
FIG. 1 is a perspective view of the cable reel of the present invention.
Figure 4:
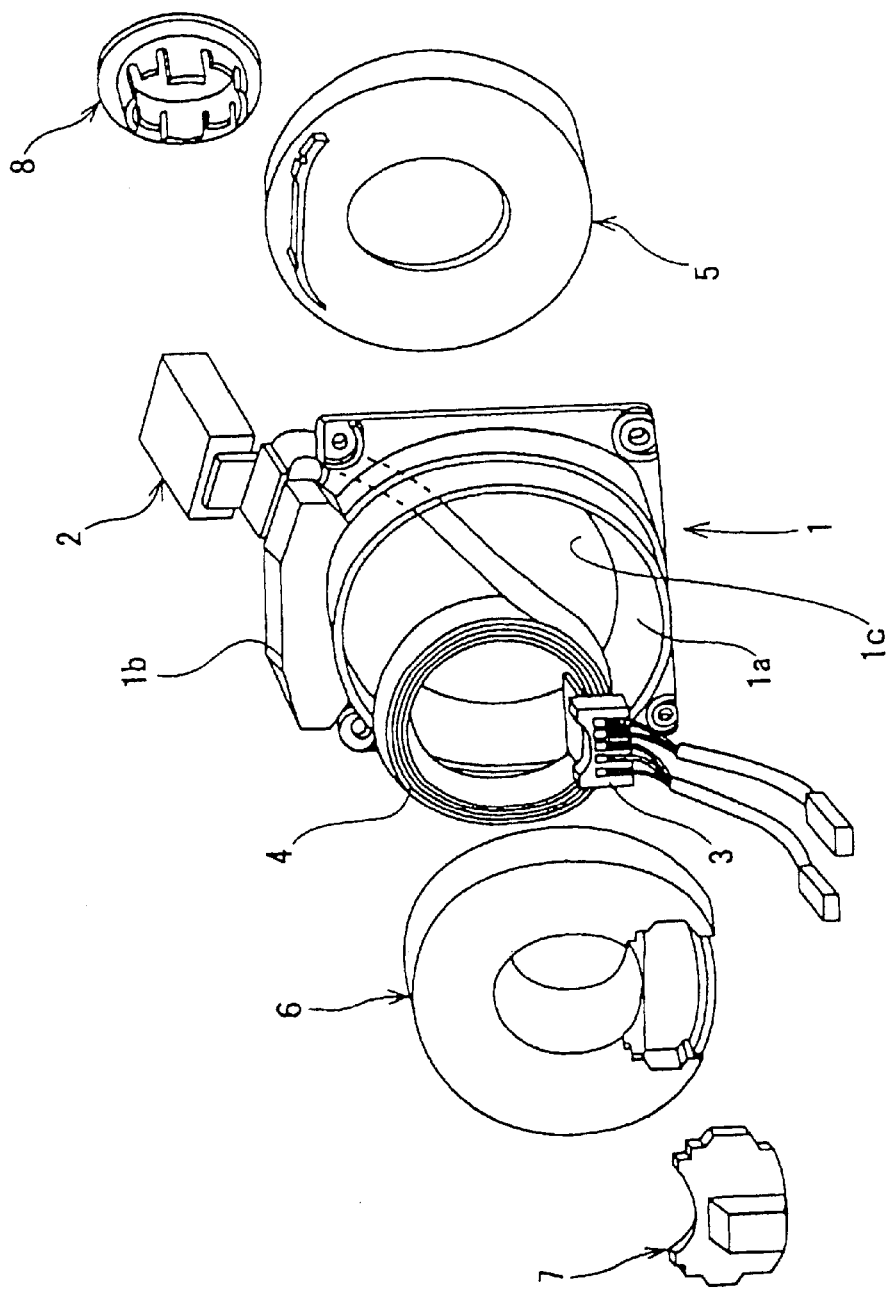
FIG. 4 is an exploded perspective view of the conventional cable reel.

The description of an embodiment of the present invention follows with reference to the drawings in which FIG. 1 shows a cable reel 10 constructed by mounting a movable case 12 onto a fixed case 11, as shown in detail in FIG. 2.

The fixed case 1 is molded from a suitable resin material, and includes a cylindrical peripheral wall 11b that protrudes upwardly from the external periphery of an annular bottom wall 11a. A combination switch is mounted in such a manner that a combination switch fixing area 11c protrudes outwardly from the annular outer peripheral end of the bottom wall 11a, and a combination switch mounting frame area 11d extends rearwardly from the combination switch fixing area 11c.

An opening 13 is provided on a portion of the peripheral wall 11b to extend from the outer end of the opening to the lower end at the bottom wall. A connector housing 11f, which is formed continuous with the bottom wall 11a, protrudes rearwardly at the lower end of the opening 13. The connector housing 11f has a housing space 11g which interfits with a connector 15 which is connected with one end of a flat cable 20, as shown in FIG. 3.

A cover 14 is configured to be mounted within the opening 13 of the peripheral wall 11b. The cover 14 has an arcuate shape having generally the same curvature as that of peripheral wall 11b. One end of the cover 14 includes an inwardly deflected stop area 14a which is provided to extend in a peripheral direction. The stop area 14a is inserted from one end of peripheral direction of opening 13 to an inner side, and under such a condition the cover 14 interfits with the opening 13 to provide the same diameter as that of peripheral wall 11b, thereby forming a part of peripheral wall 11b. Furthermore, a locking hook 14b is provided on the upper end on the cover 14 to interlock with a lock groove 15a of connector 15 which will be described hereafter.

In the annular cable housing space 16 in which a movable case 12 is mounted on the fixed case 11, a flat cable 20 is spirally housed, and connectors 15 and 17 are connected with opposite ends of the flat cable 20 (FIG. 3(A)).

The connector 15 connected with the external peripheral end of spirally wound flat cable 20 has a configuration as shown in FIG. 3(B). Narrow band bus-bars 19 are provided on an insulated board 18 and disposed in parallel, with the horizontal ends of each bus-bar welded with the tips of exposed conductors 20a of flat cable 20. Vertical lower ends of the bus-bars 19 are weld-connected with the terminals of the external cable 22.

A connector 17 connected with the inner peripheral end of flat cable 20 has almost the same configuration as the connector 15, and has a construction in which one end of the bus-bars disposed in parallel with the insulation board are welded with the conductors 20a of flat cable 20 and the other ends are welded with the terminals of external cable 25. The connector 17 is interfitted with a hole 12a provided on the movable case 12, and configured to pass the cable 25 to the outside.

Assembling of cable reel 10 starts with insertion of the flat cable 20 from an upper opening into a cable housing space which is surrounded by the bottom wall 11a and the peripheral wall 11b by first disposing the flat cable 20 in a spiral condition, each end of which is connected with a respective connector 15 and 17. Next, the connector 15 connected with the external peripheral end of the flat cable 20 is inserted into the opening 13, which positions an upper horizontal area of connector 15, on which conductor body 21 and bus-bars 19 are welded, into the opening 13. By inserting from the upper side, a lower vertical area at which the bus-bars 19 and the external cable 22 are connected to the connector housing area 11g of connector housing 11f, assembly is carried out in a condition such that the external cable 22 is withdrawn rearwardly.

In this way, after mounting the flat cable 20 and connector 15 to the fixed case 11, the cover 14 is put into the opening 13 provided on the peripheral wall 11b of fixed case 11, and then interlocked with the connector 15. The cover 14, which is mounted into the opening 13, is configured to have a generally arcuate shape conforming to the cylindrical form of peripheral wall 11b, so as not to protrude from the peripheral wall 11b. In the manner described above, a welded area between a conductor 20a of flat cable 20 and bus-bar 19 is covered, and not exposed to the outside, thereby preventing foreign objects such as dust, etc. from entering.

This allows the movable case 12 to rotate freely on the fixed case 11 and also enables the connector 17, which is connected with the other end of flat cable 20, to be withdrawn outwardly from the take-off hole of movable case 12 to interfit with the connected cable 25.

As is apparent from the above description, the cable reel according to an embodiment of the present invention enables the number of components and assembling processes to be reduced, due to the elimination of after-mounting process through unitary one piece mounting of a combination switch fixing area onto a fixed case as well as unitary mounting of the bottom wall of the fixed case with the peripheral wall, etc.

In addition, when mounting the bottom wall of the fixed case unitarily with the peripheral wall, although an opening is formed on the peripheral wall, the area where the flat cable and the bus-bars are connected is not disclosed as being to the outside due to the cover closing the opening, which improves the exterior appearance. This can also prevent foreign objects from entering the opening, and improves the quality and appearance of cable reel. Furthermore, the cover does not protrude from the peripheral wall and forms a part of the peripheral wall. Thus, the external size of the fixed case does not increase, and smaller size of the fixed case can be achieved compared with the conventional ones due to the unitary one piece configuration of the combination switch fixing area. Consequently, the installation space of cable reel can be made smaller.

Although the invention has been described with reference to particular means, materials and embodiments, it is to be understood that the invention is not limited to the particulars disclosed and extends to all equivalents within the scope of the claims.

The present disclosure relates to subject matter contained in priority Japanese Application No. JP 11-192980, filed on Jul. 7, 1999, which is expressly incorporated herein by reference in its entirety.

What is claimed:

1. A cable reel including a fixed case having a peripheral wall that protrudes from an outer periphery of an annular-type bottom wall, a movable case having a peripheral wall that protrudes from the inner periphery of an annular upper wall, said fixed case and said movable case being interfitted in a rotatable manner and forming an annular cable housing space, and said fixed case and said movable case house a flat cable spirally in the cable housing space;

an opening formed in a portion of the peripheral wall of said fixed case, and a connector housing integrally provided with a combination switch fixing area being formed on the bottom wall at a lower end of said opening; and a connector connected by welding to the terminals of an external cable at a vertical lower end of a bus-bar by laying narrow-strip bus-bars in parallel on an insulation board with exposed ends of the flat cable conductors welded to the end in the horizontal direction of each bus-bar; whereby, the welding area of said flat cable and said bus-bar of said connector is positioned at said opening, the welding area of the bus-bar and said external cable is interfitted into said connector housing, and said opening in said peripheral wall of said fixed case is covered with a cover such that a continuous peripheral wall is provided, with said cover having the same curvature as said peripheral wall of said fixed case.

2. The cable reel as set forth in claim 1, wherein said cover is fixed to said peripheral wall by one of a locking connection and thermal adhesive.

3. A cable reel comprising:

a fixed case having an an annular bottom wall, said fixed case including a peripheral wall that extends upwardly from an outer periphery of said annular bottom wall;

a movable case having an annular upper wall, said movable case including a peripheral wall that extends outwardly from the inner periphery of said annular upper wall;

said fixed case and said movable case being configured to interfit in a rotatable manner and to form an annular cable housing space;

a flat cable spirally wound in said annular cable housing space; and an opening formed in a portion of said peripheral wall of said fixed case; and a connector housing formed unitarily and in one piece with a combination switch fixing area on said bottom wall at a lower end of said opening.

4. The cable reel as set forth in claim 3, further comprising a connector connected to the terminals of an external cable at a vertical lower end of a bus-bar.

5. The cable reel as set forth in claim 4, wherein said connector is connected to the terminals of said external cable by welding.

6. The cable reel as set forth in claim 5, wherein said welding further comprises laying narrow-strip bus-bars in parallel on an insulation board with exposed ends of flat cable conductors welded to ends of each bus-bar in a horizontal direction.

7. The cable reel as set forth in claim 6, wherein the welding area of said flat cable and said bus-bar of said connector is positioned at said opening, and the welding area of the bus-bar and said external cable is interfitted into said connector housing.

8. The cable reel as set forth in claim 7, wherein said opening in said peripheral wall of said fixed case is provided with a cover, such that a continuous peripheral wall is provided.

9. The cable reel as set forth in claim 8, wherein said cover is provided to have a same curvature as said peripheral wall of said fixed case.

10. The cable reel as set forth in claim 9, wherein said cover is fixed to said peripheral wall by one of a locking connection and thermal adhesive.

* * * * *

UNITED STATES PATENT AND TRADEMARK OFFICE
CERTIFICATE OF CORRECTION

PATENT NO. : 6,364,079 B1
DATED : April 2, 2002
INVENTOR(S) : Y. Hiura

It is certified that error appears in the above-identified patent and that said Letters Patent is hereby corrected as shown below:

Column 6,
Line 12, delete "an" (second occurrence).

Signed and Sealed this

Fifteenth Day of October, 2002

*Attest:*

JAMES E. ROGAN
*Attesting Officer*     *Director of the United States Patent and Trademark Office*